US012411430B2

(12) United States Patent
Ueda et al.

(10) Patent No.: US 12,411,430 B2
(45) Date of Patent: Sep. 9, 2025

(54) ELECTROSTATIC LATENT IMAGE DEVELOPING TONER AND ELECTROSTATIC LATENT IMAGE DEVELOPING TONER SET

(71) Applicant: Konica Minolta, Inc., Tokyo (JP)

(72) Inventors: Junya Ueda, Hino (JP); Yohei Maruyama, Toyohashi (JP); Shinya Obara, Fuchu (JP)

(73) Assignee: KONICA MINOLTA, INC., Tokyo (JP)

( * ) Notice: Subject to any disclaimer, the term of this patent is extended or adjusted under 35 U.S.C. 154(b) by 799 days.

(21) Appl. No.: 17/659,230

(22) Filed: Apr. 14, 2022

(65) Prior Publication Data

US 2022/0397838 A1 Dec. 15, 2022

(30) Foreign Application Priority Data

Jun. 2, 2021 (JP) ................................ 2021-092699

(51) Int. Cl.

*G03G 9/097* (2006.01)
*G03G 9/08* (2006.01)
*G03G 9/087* (2006.01)

(52) U.S. Cl.

CPC ....... *G03G 9/09725* (2013.01); *G03G 9/0819* (2013.01); *G03G 9/08755* (2013.01); *G03G 9/09708* (2013.01)

(58) Field of Classification Search

CPC ............. G03G 9/0902; G03G 9/09708; G03G 9/09725

See application file for complete search history.

(56) References Cited

FOREIGN PATENT DOCUMENTS

| | | | | |
|---|---|---|---|---|
| JP | 09218529 A | * | 8/1997 |
| JP | H09-218529 A | | 8/1997 |
| JP | 2016057536 A | * | 4/2016 |
| JP | 2018-060174 A | | 4/2018 |

OTHER PUBLICATIONS

Translation of JP-09218529-A.*
Translation of JP-2016057536-A.*
Office Action issued for the related Japanese patent application No. 2021-092699, mailed on Jan. 7, 2025, with its machine English translation, 9 pages.

* cited by examiner

*Primary Examiner* — Peter L Vajda
(74) *Attorney, Agent, or Firm* — LUCAS & MERCANTI, LLP

(57) ABSTRACT

Provided is an electrostatic latent image developing toner including: toner base particles containing a binder resin and a white pigment; and an external additive, wherein silica particles are contained as the external additive, and the following relational expression (1) is satisfied, Relational expression (1): $0.70 \leq Wh\_Si(B)/Wh\_Si(A) \leq 0.95$, in the above relational expression (1), Wh_Si (A) represents an NET intensity of a Si element contained in the white electrostatic latent image developing toner measured by wavelength dispersive X-ray fluorescence spectrometer, and Wh_Si (B) represents an NET intensity of a Si element contained in the white electrostatic latent image developing toner that has been ultrasonically dispersed in water.

3 Claims, No Drawings

ELECTROSTATIC LATENT IMAGE DEVELOPING TONER AND ELECTROSTATIC LATENT IMAGE DEVELOPING TONER SET

CROSS-REFERENCE TO RELATED APPLICATIONS

The entire disclosure of Japanese Patent Application No. 2021-092699 filed on Jun. 2, 2021 is incorporated herein by reference in its entirety.

BACKGROUND

Technological Field

The present invention relates to an electrostatic latent image developing toner and an electrostatic latent image developing toner set. In particular, the present invention relates to an electrostatic latent image developing toner which is capable of preventing an external additive on a surface of a white toner from migrating to a colored toner, suppress generation of transferred dusts, and have excellent image quality.

Description of the Related Art

In recent years, in the field of electrostatic charge image developing toner (hereinafter, also simply referred to as a "toner") used for electrophotographic image formation, development has been carried out in response to various demands from the market. In particular, the types of recording media for printing are increasing, and the compatibility of printing machines with recording media is extremely high in the market. For example, when outputting to a special recording medium such as colored paper, black paper, aluminum vapor-deposited paper, or transparent film, the color characteristics of the recording medium affect the color toner consisting of four colors: yellow, magenta, cyan, and black, as a result, sufficient color development may not be obtained with this set alone. Therefore, as the fifth color, a toner set containing a white toner in the lowermost layer is used for image formation. For example, refer to Patent Document 1 (JP-A 2016-57536).

In order to ensure the concealment of the recording medium, the white toner is generally used by placing more toner on the recording medium than the four-color toner of YMCK. Therefore, it is known to increase the filling of pigments and the amount of white toner loaded. However, if the white pigment is highly filled or the loading amount is increased to improve the hiding power, the white pigment, for example, titanium oxide, is easily exposed on the surface of the toner particles. Therefore, when the white toner and the colored toner are used at the same time, the external additive on the surface of the white toner is transferred to the colored toner at the time of transfer to the recording medium, and the exposed titanium oxide on the surface of the white toner causes a charge leak. It was found that the colored toner was scattered during transfer and image defects were likely to occur.

SUMMARY

The present invention has been made in view of the above problems and circumstances. The problem to be solved is to provide an electrostatic latent image developing toner and an electrostatic latent image developing toner set when white toner and colored toner are used at the same time. These toner and toner set make it possible to prevent the external additive on the surface of the white toner from migrating to the colored toner, and as a result, the exposure of the surface of the white toner is suppressed and the charge leakage is suppressed, and as a result, the image quality is improved without generation of transferred dusts.

The present inventors have found the following in the process of examining the cause of the above problem in order to solve the above problem. That is, by defining the adhesive strength of the white toner, it is possible to prevent the external additive on the surface of the white toner from migrating to the colored toner, suppress generation of transferred dusts, and to provide an electrostatic latent image developing toner having excellent image quality. Thus the present invention has been achieved. That is, the above-mentioned problem according to the present invention is solved by the following means.

To achieve at least one of the above-mentioned objects of the present invention, an electrostatic latent image developing toner and an electrostatic latent image developing toner set that reflect an aspect of the present invention are as follows.

Embodiment 1

An electrostatic latent image developing toner comprising: toner base particles containing a binder resin and a white pigment; and an external additive, wherein silica particles are contained as the external additive, and the following relational expression (1) is satisfied, $$0.70 \leq Wh\_Si(B)/Wh\_Si(A) \leq 0.95 \qquad \text{Relational expression (1):}$$

in the above relational expression (1), Wh_Si (A) represents an NET intensity of a Si element contained in the white electrostatic latent image developing toner measured by wavelength dispersive X-ray fluorescence spectrometer, and Wh_Si (B) represents an NET intensity of a Si element contained in the white electrostatic latent image developing toner that has been ultrasonically dispersed in water.

By the above means of the present invention, it is possible to prevent the external additive on the surface of the white toner from migrating to the colored toner when the white toner and the colored toner are used at the same time, thereby suppressing the exposure of the white toner surface, suppressing charge leakage. As a result, it is possible to provide an electrostatic latent image developing toner and an electrostatic latent image developing toner set excellent in image quality without generating transferred dusts.

The expression mechanism or action mechanism of the effect of the invention is not clear, but is speculated as follows. Since the white electrostatic latent image developing toner of the present invention contains silica particles as an external additive and satisfies the above-mentioned relational expression (1), the adhesion strength of the external additive of the white electrostatic latent image developing toner becomes high. Therefore, when the white toner and the colored toner are transferred onto the recording medium, the external additive of the white toner is strongly attached to the colored toner, so that the exposure of the white pigment due to the transfer of the external additive of the white toner to the colored toner during transfer may be suppressed, and the suppression of charge leakage may be achieved. As a result, it is presumed that the colored toner will not scatter during transfer and image defects may be prevented.

DETAILED DESCRIPTION OF THE EMBODIMENTS

Hereinafter, one or more embodiments of the present invention will be described. However, the scope of the invention is not limited to the disclosed However, the scope of the invention is not limited to the disclosed embodiments.

The electrostatic latent image developing toner of the present invention is an electrostatic latent image developing toner comprising at least toner base particles containing a binder resin and a white pigment, an external additive, and it is characterized in that it contains silica particles as the external additive and satisfies the above-mentioned relational expression (1). This feature is a technical feature common to or corresponding to each of the following embodiments.

The electrostatic latent image developing toner set of the present invention is characterized in that it includes: the electrostatic latent image developing toner containing a white pigment; and a colored electrostatic latent image developing toner including toner base particles containing at least a binder resin and a colored colorant other than white, and an external additive.

As an embodiment of the present invention, it is preferable to satisfy the relational expression (2), and particularly preferably to satisfy the relational expression (3), from the viewpoint of suppressing charge leakage and suppressing generation of transferred dusts.

It is preferred that the external additive in the white electrostatic latent image developing toner further contains titanium dioxide particles, and that the number average primary particle diameter of the titanium dioxide particles is in the range of 60 to 120 nm. When the number average primary particle diameter is 60 nm or more, the silica particles added to the surface of the white toner base particles may be strongly adhered to by the titanium dioxide particles, which have a higher specific gravity. When it is 120 nm or less, it is possible to suppress charge leakage of the titanium dioxide particles themselves.

It is preferable that the number average primary particle diameter of the titanium dioxide particles is larger than the number average primary particle diameter of the silica particles, because the silica particles are added to the surface of the white toner base particles first, which allows the silica particles to adhere more strongly to the toner base particle surface.

Hereinafter, the present invention, its constituent elements, and modes and embodiments for carrying out the present invention will be described. In this application, "to" is used in the sense that it includes the numerical values described before and after "to" as the lower and upper limits.

[Outline of Electrostatic Latent Image Developing Toner]

The electrostatic latent image developing toner of the present invention is characterized in that it is an electrostatic latent image developing toner including at least toner base particles containing a binder resin and a white pigment, and an external additive, and that it contains silica particles as the external additive, and satisfies the following relational expression (1).

$$0.70 \leq Wh\_Si(B)/Wh\_Si(A) \leq 0.95 \qquad \text{Relational expression (1):}$$

in the above relational expression (1), Wh_Si (A) represents an NET intensity of a Si element contained in the white electrostatic latent image developing toner measured by wavelength dispersive X-ray fluorescence spectrometer, and Wh_Si (B) represents an NET intensity of a Si element contained in the white electrostatic latent image developing toner that has been ultrasonically dispersed in water.

The above "Wh_Si (A)" represents a NET intensity of a Si element contained in the white electrostatic latent image developing toner, as measured by a wavelength dispersive X-ray fluorescence analyzer. When the surface of silica particles is surface-modified with silicone oil, the NET intensity of the Si element reflects all the Si element included in "silica particles whose surface is modified with silicone oil", "other silica particles such as silica particles whose surface is not modified with silicone oil", "adhered silicone oil", and "free silicone oil".

On the other hand, the above "Wh_Si (B)" represents the NET intensity of the Si element contained in the white toner which has been ultrasonically dispersed in water. That is, "Wh_Si (B)" represents the NET intensity of the Si element of the silica particles that are not released and remain in the toner even by the ultrasonic dispersion treatment in water. Alternatively, when the surface is modified with silicone oil, it represents the NET strength of all Si elements contained in the silicone oil.

Therefore, the value of "Wh_Si(B)/Wh_Si(A)" indicates the ratio of all Si elements contained in the silica particles or silicone oil that are attached to the white toner so strongly that they can remain in the toner without being released even after the ultrasonic dispersion treatment in water. This is the ratio of all Si elements in silica particles or silicone oil that are attached so strongly that they remain free even after ultrasonic dispersion treatment in water. In particular, considering the ease of release of silicone oil in the ultrasonic dispersion treatment in water described above, it effectively indicates the ratio of silica particles in a strongly adherent state. In other words, "Wh_Si(B)/Wh_Si(A)" represents the strength of adhesion of silica particles to the surface of the toner base particles of the white toner. In addition, the term "Co_Si(B)/Co_Si (A)", which will be described later, represents the adhesion strength of silica particles to the surface of the toner base particles of the colored toner, as in the above-described "Wh_Si(B)/Wh_Si(A)".

It is also particularly preferable that the white toner of the present invention satisfies the following relational expression (1-1).

$$0.8 \leq Wh\_Si(B)/Wh\_Si(A) \leq 0.9 \qquad \text{Relational expression (1-1)}$$

<Method of Obtaining Toner that has been Ultrasonically Dispersed in Water>

Wet 3 g of white toner in a 100 mL plastic cup with 40 g of a 0.2 mass % aqueous solution of polyoxyethyl phenyl ether. A ultrasonic homogenizer "US-1200" (manufactured by Nihon Seiki) was used to apply ultrasonic energy so that the value on the ammeter attached to the main unit to 60 μA (50 W), which indicates the vibration indication value. After that, the aqueous solution containing dispersed white toner is centrifuged at 292 G for 10 minutes.

Centrifuge used: Model H-900 (manufactured by Kokusan Co. Ltd.)

Rotor: PC-400 (radius: 18.1 cm)

Rotation speed: 1200 rpm (292 G)

Time: 15 minutes

After centrifugation, discard the supernatant liquid. The remainder was remixed with 60 mL of pure water, filtered using a 1 μm mesh filter, and then washed with 6 mL of pure water and collected. The recovered product was remixed again with 60 mL of pure water, filtered through a 1 μm filter, and washed with 60 mL of pure water. The collected product was dried.

<Measuring Method of NET Strength>

The method for measuring the NET intensity contained in the "white toner of the present invention" (which has not been ultrasonically dispersed in water) and the "white toner of the present invention which has been ultrasonically dispersed in water" was as follows.

The NET intensity of the metallic element Si contained in the white toner was measured by scanning X-ray fluorescence spectrometer ZSX Primus IV (manufactured by Rigaku Co., Ltd.), as described below.

2 g of toner pelletized by pressurization was set in ZSX Primus IV and set the measurement conditions as follows: voltage of 50 kV and tube current of 60 mA. The NET intensity of Si was determined by the background removal method (1, and 2-point method).

The means for satisfying the above-mentioned relational expression (1) include, for example, further containing titanium dioxide particles as an external additive and controlling the number average primary particle diameter of the titanium dioxide particles and silica particles, as well as the peripheral speed of the tip of the agitator blade when adding the external additive to the white toner. Specifically, it is preferable that the number average primary particle diameter of the titanium oxide particles is in the range of 60 to 120 nm and it is larger than the number average primary particle diameter of the silica particles. The peripheral speed is preferably in the range of 20 to 60 m/s.

[Electrostatic Latent Image Developing Toner Set]

The toner set for electrostatic latent image development of the present invention (hereinafter simply referred to as a "toner set") is characterized in that it is composed of the white electrostatic latent image developing toner described in the above embodiment 1, a colored electrostatic latent image developing toner including at least toner base particles containing a binder resin and a colored colorant other than white, and an external additive (hereinafter also referred to simply as a "colored toner").

Here, in the present specification, the white color of the white toner is a value measured on the surface of the white toner in accordance with JIS Z8781-4: 2013 when only the white toner is transferred onto the transfer material. The white color means that the brightness L* in the CIEL*a*b* color system is 75 or more, and a* and b* satisfy the conditions of $-10 \leq a^* \leq 10$ and $-10 \leq b^* \leq 10$, respectively. In addition, "colored" means a color other than white.

The toner set of the present invention may also include, if necessary, other toners described below in addition to the white toner and colored toner, to the extent that the effects of the present invention are not impaired.

It is preferable for the toner set of the present invention to satisfy the following relational expression (2) from the viewpoint of suppressing charge leakage and inhibiting generation of transferred dusts.

$$Co\_Si(B)/Co\_Si(A) \leq Wh\_Si(B)/Wh\_Si(A) \quad \text{Relational expression (2):}$$

In the above relational expression (2), Co_Si (A) represents the NET intensity of the Si element contained in the colored electrostatic latent image developing toner as measured by wavelength dispersive X-ray fluorescence spectrometer. Co_Si(B) represents the NET intensity of the Si element contained in the colored electrostatic latent image developing toner that has been ultrasonically dispersed in water, as measured by wavelength-dispersive X-ray fluorescence spectrometer.

The method for measuring the NET strength contained in the "colored toner" (which has not been ultrasonically dispersed in water) and the "colored toner which has been ultrasonically dispersed in water" are adopted the same method as the method for ultrasonic dispersion treatment of white toner in water and the method for measuring NET intensity.

In addition, the toner set of the present invention preferably satisfies the following relational expression (3), and especially the following relational expression (3-1).

$$0.2 \leq (Wh\_Si(B)/Wh\_Si(A))-(Co\_Si(B)/Co\_Si(A)) \leq 0.5 \quad \text{Relational expression (3):}$$

$$0.3 \leq (Wh\_Si(B)/Wh\_Si(A))-(Co\_Si(B)/Co\_Si(A)) \leq 0.45 \quad \text{Relational expression (3-1):}$$

In other words, by making the external additive adhesion strength of the white toner higher than that of the colored toner, the exposure of the toner base particles of the white toner may be suppressed by the migration of the external additive of the colored toner. Therefore, when the difference between the external additive adhesion strength of the white toner and the external additive adhesion strength of the colored toner ((Wh_Si(B)/Wh_Si(A))−(Co_Si Si(B)/Co_Si (A)) is 0.2 or more, it is possible to suppress cleaning defects caused by white toner due to the small amount of external additive migration of colored toner to white toner. In addition, transferred dusts may be suppressed due to the transfer of external additives from the colored toner to the white toner. On the other hand, when the difference is 0.5 or less, it is possible to suppress cleaning defects caused by the colored toner due to the increase in the transfer of the external additive of the colored toner to the white toner.

The means for satisfying the above relational expressions (2), (3) and (3-1) include the peripheral speed of the tip of the agitator blades when adding external additives to colored toner. Specifically, the aforementioned peripheral speed is preferably in the range of 20 to 60 m/s.

Further, Wh_Si(B)/Wh_Si(A) is preferably in the range of 0.8 to 0.9.

Hereinafter, the configurations of the white toner and the colored toner will be described.

[White Toner]

The white toner of the present invention contains at least toner base particles containing a binder resin and a white pigment (also referred to as "white toner base particles") and an external additive. The white toner contains silica particles as the external additive.

In the present specification, the "toner base particle" constitutes the base of the "toner particle", and the "toner base particle" is referred to as "toner particle" by the addition of an external additive. The "toner" means an aggregate of "toner particles".

<White Toner Base Particles>

The white toner base particles contain at least a binder resin and a white pigment. When needed, the white toner base particles may also contain known additives (internal additives) other than the binder resin and the white pigment.

(White Pigment)

Preferable examples of the white pigment include particles of titanium dioxide, zinc oxide, barium sulfate, alumina, and calcium carbonate. Among these, titanium dioxide particles are preferably contained.

The titanium dioxide particles mentioned above are titanium dioxide particles whose surface has been modified by a surface modifier (also referred to as "surface-modified titanium dioxide particles"). Here, the term "surface modification" includes a case where a part of the particle surface is surface-modified and a case where the entire particle surface is surface-modified.

The titanium dioxide particles may be obtained by any production method, such as the sulfuric acid method or the chlorine method. The crystal structure of titanium dioxide particles includes anatase, rutile, and brookite types. Of these, titanium dioxide particles having a rutile-type crystal structure are preferred, especially from the viewpoint of high Mohs hardness and resistance to abrasion.

Here, the Mohs hardness of titanium dioxide particles may be measured using a known Mohs hardness tester. Specifically, titanium dioxide particles are hardened by a pressurized molding machine to prepare pellets. The Mohs hardness test was proposed by F. Mohs, and the following ten minerals were selected. Scratch the prepared titanium dioxide pellets with the selected minerals, and if they are scratched, the hardness is lower than that of the mineral. The presence or absence of scratches is determined visually. The minerals, in ascending order of hardness, are, 1: Talc, 2: Gypsum, 3: Calcite, 4: Fluorite, 5: Fluorite, 6: Orthoclase, 7: Quartz, 8: Topaz, 9: Steel ball, and 10: Diamond. The Mohs hardness is evaluated in increments of 0.5. For example, a Mohs hardness of 7 means that both are scratched when the measurement target is rubbed against the Quartz, and a Mohs hardness of 7.5 means that only the Quartz is scratched when the measurement target and the Quartz are rubbed together, and only the measurement target is scratched when the measurement target and the Topaz are rubbed together.

For titanium dioxide particles with a rutile-type crystal structure, the Mohs hardness measured by the above method is 7.5. The Mohs hardness measured by the above method for titanium dioxide particles with anatase-type crystal structure and titanium dioxide particles with a brookite-type crystal structure is 6 in each case.

The material constituting the surface-modified layer in the surface-modified titanium oxide particles is not particularly limited as long as the effect of the present invention is not impaired. Exampled thereof include antimony doped tin oxide, aluminum hydroxide, silica, siloxane, and stearic acid. Among these, antimony doped tin oxide is preferable because it has conductivity and may prevent poor charging of the toner.

The particle shape of surface-modified titanium dioxide particles can be said to be the same as the shape of titanium dioxide particles before being surface-modified. The shape of the surface-modified titanium dioxide particles is not particularly limited, and may be spherical, spindle-shaped, needle-shaped, and plate-shaped. Among them, spherical or spindle-shaped particles are preferred.

The average primary particle diameter of surface-modified titanium dioxide particles is determined by measuring the Feret diameter of 100 particles by scanning electron microscope images and averaging them. The particle diameter of titanium dioxide is preferably 0.15 to 0.35 μm because of its high whiteness and hiding properties, and more preferably it is 0.2 to 0.3 μm. The thickness of the surface-modifying layer depends on the type of surface-modifying layer, but in the case of an antimony-doped tin oxide layer, for example, it is about 5 to 20 nm, and 5 to 15 nm is more preferable.

As the surface-modified titanium oxide particles, commercially available ones may also be used. Examples of commercially available surface-modified titanium oxide particles include ET-500W, ET-600W, and ET-300W of Ishihara Sangyo Kaisha, Ltd. as surface-modified titanium oxide particles with antimony-doped tin oxide.

The content of surface-modified titanium dioxide particles in the white toner base particles is preferably in the range of 1.5 to 50 mass5 of the total amount of white toner base particles (Am), from the viewpoint of being able to sufficiently demonstrate whiteness (hiding property) without causing a decrease in chargeability. It is more preferable to be in the range of 30 to 40 mass %. In addition, it is preferable to be in the range of 40 to 80 mass parts for 100 mass parts of the binder resin described below. It is more preferable to be in the range of 50 to 80 mass parts.

(Binder Resin)

The binder resin used in the present invention is not particularly limited, and it is preferable to include both an amorphous resin and a crystalline resin.

A crystalline resin in the present invention refers to a resin that has a clear endothermic peak in differential scanning calorimetry (DSC), rather than a staircase-like endothermic change. A clear endothermic peak is specifically defined as a peak with a half value width of 15° C. or less in differential scanning calorimetry (DSC), for example, when measured at a temperature rise rate of 10° C./min. An amorphous resin in the present invention is a resin that does not have a melting point and has a relatively high glass transition temperature (Tg) when differential scanning calorimetry (DSC) is performed on the resin.

As a crystalline resin for the present invention, any conventional crystalline resin known in the art may be used. As a crystalline resin, a crystalline polyester resin is preferred.

Examples of the amorphous resins according to the present invention include a vinyl resin, a urethane resin, a urea resin, and an amorphous polyester resin. In the present invention, it is preferable to use a vinyl resin as the amorphous resin from the viewpoint of suppressing a decrease in charge amount under high temperature and high humidity. Among vinyl resins, a styrene-acrylic resin is preferable. It is also preferable to use an amorphous polyester resin from the viewpoint that the melt property has low viscosity and high sharp-melt property.

(Crystalline Polyester Resin)

The crystalline polyester resin is a crystalline resin obtained by a polycondensation reaction between a divalent or higher carboxylic acid (polyvalent carboxylic acid) and a divalent or higher alcohol (polyhydric alcohol).

Polyvalent carboxylic acids are compounds that have two or more carboxy groups in one molecule, and alkyl esters, acid anhydrides, and acid chlorides of polyvalent carboxylic acids may be used.

Examples of the polyvalent carboxylic acid component include: dicarboxylic acids such as oxalic acid, succinic acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-dicarboxylic acid, malic acid, citric acid, hexahydroterephthalic acid, malonic acid, pimelic acid, tartaric acid, mucic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediglycolic acid, p-phenylenediglycolic acid, o diphenylacetic acid, diphenyl-p,p'-dicarboxylic acid, naphthalene-1,4-dicarboxylic acid 1,4-dicarboxylic acid, naphthalene-1,5-dicarboxylic acid, naphthalene-2,6-dicarboxylic acid Dicarboxylic acids such as naphthalene-1,4-dicarboxylic acid, naphthalene-1,5-dicarboxylic acid, naphthalene-2,6-dicarboxylic acid, anthracenedicarboxylic acid, and dodecenyl succinic acid; and trivalent or higher carboxylic acids such as trimellitic acid, pyromellitic acid, naphthalene tricarboxylic acid, naphthalene tetracarboxylic acid, pyrene tricarboxylic acid, and pyrene dicarboxylic acid, pyrene tricarboxylic acid, and pyrene tetracarboxylic acid. These polyvalent carboxylic acids may be used alone, or two or more may be used in combination.

Polyhydric alcohols are compounds that have two or more hydroxy groups in one molecule.

Examples of the polyhydric alcohol includes divalent alcohols such as ethylene glycol, propylene glycol, butanediol, diethylene glycol, hexanediol, cyclohexanediol, octanediol, decanediol, dodecanediol, ethylene oxide adducts of bisphenol A, propylene oxide adducts of bisphenol A; trivalent or higher polyols such as glycerin, pentaerythritol, hexamethylol melamine, hexaethylol melamine, tetramethylol benzoguanamine, and tetraethylol benzoguanamine.

As a catalyst for synthesizing crystalline polyester resin, various conventional catalysts may be used, such as esterification catalysts.

Examples of the esterification catalyst include tin compounds such as dibutyltin oxide, tin(II) 2-ethylhexanoate; and titanium compounds such as titanium diisopropylate bistriethanolamine, and titanium tetraisopropoxid. As an auxiliary esterification catalyst, gallic acid is mentioned.

The amount of the esterification catalyst used is preferably in the range of 0.01 to 1.5 parts by mass with respect to 100 parts by mass of the total amount of the polyhydric alcohol, the polyvalent carboxylic acid and the bireactive monomer component. It is more preferably in the range of 1 to 1.0 parts by mass. The amount of auxiliary esterification catalyst used is in the range of 0.01 to 1.5 parts by mass per 100 parts by mass of the total amount of polyhydric alcohol, polyvalent carboxylic acid, and bireactive monomer component. It is more preferable in the range of 0.01 to 0.1 parts by mass.

Examples of the combination of a polyvalent carboxylic acid and a polyhydric alcohol to form crystalline polyester resins that may be used in the present invention include: 1,12-dodecanediol (12 carbon atoms) and sebacic acid (10 carbon atoms), ethylene glycol (2 carbon atoms) and sebacic acid (10 carbon atoms), 1,6-hexanediol (6 carbon atoms) and 1,10-decanedicarboxylic acid (12 carbon atoms), 1,9-nonanediol (9 carbon atoms) and 1,10-decanedicarboxylic acid (12 carbon atoms), 1,6-hexanediol (6 carbon atoms) and 1 sebacic acid (10 carbon atoms), and 1,6-hexanediol (6 carbon atoms) and 1,12-dodecanedicarboxylic acid (14 carbon atoms).

The weight average molecular weight (Mw) of the crystalline polyester resin is preferably 2,000 and 20,000. When the Mw of the crystalline polyester resin is within the above range, the resulting toner does not have a low melting point as a whole particle and has excellent blocking resistance, and also has excellent low-temperature fixing property. The above Mw is a polystyrene-based Mw measured by GPC.

The melting point Tm of the crystalline polyester resin is preferably within the range of 50 to 120° C., and more preferably within the range of 60 to 90° C. When the melting point Tm of the crystalline polyester resin is within the range of 50 to 120° C., the low-temperature fixing property and the fixing separation property may be adequately obtained.

The melting point Tm of a crystalline polyester resin may be measured by differential calorimetry (DSC). For example, it may be measured under the following conditions: measurement temperature 0 to 200° C., temperature rise rate 10° C./min, and temperature decrease rate 10° C./min. DSC measurement is performed by controlling the temperature of Heat-Cool-Heat. The melting point Tm is the temperature of the peak top of the endothermic peak in the second heat.

(Amorphous Polyester Resin)

Amorphous polyester resins are polyester resins other than the crystalline polyester resin mentioned above. In other words, they usually do not have a melting point and have a relatively high glass transition temperature (Tg). More specifically, the glass transition temperature (Tg) is preferably in the range of 40 to 90° C., and more preferably in the range of 42 to 80° C.

The weight average molecular weight (Mw) of the amorphous polyester resin by gel permeation chromatography (GPC) is preferably 10,000 to 70,000, more preferably 15,000 to 55,00o. When the weight average molecular weight is too large or too small, sufficient fixability may not be obtained in either case.

Amorphous polyester resins are obtained by polycondensation reactions of polyvalent carboxylic acids and polyhydric alcohols in the same way as crystalline polyester resins. Amorphous polyester resins may be produced in the same way as the crystalline polyester resins described above.

As polyhydric alcohols to be used, there are no particular limitations. Examples thereof include: bisphenols such as bisphenol A and bisphenol F, and alkylene oxide adducts of bisphenols such as ethylene oxide adducts and propylene oxide adducts of these can be mentioned. Examples of polyhydric alcohols of trivalent or higher value include glycerin, trimethylolpropane, pentaerythritol, and sorbitol. Thus, the use of alkylene oxide adducts of bisphenols as a raw material for the amorphous resin is preferable in terms of chargeability and toner strength.

The polyhydric alcohol may contain a linear aliphatic diol in addition to bisphenols. Furthermore, cyclohexanedimethanol, cyclohexanediol, and neopentyl alcohol may be used for reasons of production cost and environmental friendliness. In addition, as polyhydric alcohols capable of forming an amorphous polyester resin, unsaturated polyhydric alcohols such as 2-butyne-1,4diol, 3-butyne-1,4diol, and 9-octadezen-7,12diol may also be used. These polyhydric alcohols may be used alone or in combination of two or more.

For example, the polyvalent carboxylic acids to be condensed with polyhydric alcohols may be selected from linear aliphatic dicarboxylic acids, or unsaturated aliphatic carboxylic acids such as fumaric acid, maleic acid, and alkenyl succinic acid. They may be aliphatic carboxylic anhydrides such as maleic anhydride and alkenyl succinic anhydride. Alternatively, they may be aromatic carboxylic acids such as terephthalic acid, isophthalic acid, phthalic anhydride, and naphthalene dicarboxylic acid. They may also be alicyclic carboxylic acids such as cyclohexanedicarboxylic acid. In addition, lower alkyl esters and acid anhydrides of these acids are also acceptable.

The use of fumaric acid is preferable in terms of chargeability and emulsification ease. The use of terephthalic acid is preferred in terms of chargeability and toner strength.

The use of alkenyl succinic acid or its anhydride is preferable in that the alkenyl group, which is more hydrophobic than other functional groups, may be more easily miscible with crystalline polyester resin. Examples of alkenyl succinic acid components include n-dodecyl succinic acid, dodecenyl succinic acid aqueous, n-dodecenyl succinic acid, isododecyl succinic acid, isododecenyl succinic acid, n-octylsuccinic acid, and n-octenylsuccinic acid, and their acid anhydrides, acid chlorides, and lower alkyl esters with 1 to 3 carbon atoms.

Furthermore, the inclusion of a trivalent or higher carboxylic acid allows the polymer chain to take on a cross-linked structure, and this cross-linked structure may suppress the decrease in elastic modulus at high temperatures and improve the offsetting property at high temperatures. Therefore, it is also preferable to include a trivalent or higher carboxylic acid.

Examples of the above trivalent carboxylic acid include trimellitic acid such as 1,2,4-benzenetricarboxylic acid and 1,2,5-benzenetricarboxylic acid, 1,2,4-naphthalentricarboxylic acid, hemimellitic acid, trimethinic acid, merophanic acid, planitic acid, pyromellitic acid, meritic acid, 1,2,3,4-butanetetracarboxylic acid, as well as their acid anhydrides, acid chlorides, and lower-alkyl esters with 1 to 3 carbon atoms. Among them, trimellitic acid (anhydride) is particularly suitable. These polyvalent carboxylic acids may be used alone or in combination with two or more other types.

(Styrene-Acrylic Resin)

The Styrene-acrylic resin is a resin formed using styrene monomer and (meth)acrylic ester monomer.

In this specification, an "acrylic resin" includes methacrylic resin in its scope. The term "(meth)acrylic acid" means at least one of acrylic acid and methacrylic acid. The term "(meth)acrylate" means at least one of acrylate and methacrylate.

Specific examples of the styrene-based monomer and the (meth)acrylic acid ester monomer capable of forming the styrene-acrylic resin are shown below. However, those that may be used for forming the styrene-acrylic resin used in the present invention are not limited to those shown below.

Examples of the styrene-based monomer include styrene, o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nononylstyrene, p-n-decylstyrene, p-n-and dodecylstyrene, and their derivatives. These styrene monomers may be used alone or in combination of two or more types.

Examples of the (meth)acrylate monomer include methyl (meth)acrylate, ethyl (meth)acrylate, isopropyl (meth)acrylate, n-butyl (meth)acrylate Butyl (meth)acrylate, isopropyl (meth)acrylate, n-butyl (meth)acrylate, t-butyl (meth)acrylate, isobutyl (meth)acrylate, n-octyl (meth)acrylate, 2-ethylhexyl (meth)acrylate, stearyl (meth)acrylate Stearyl (meth)acrylate, lauryl (meth)acrylate, phenyl (meth)acrylate, diethylaminoethyl methacrylate, and dimethylaminoethyl methacrylate.

In addition to the above, a third polymerizable monomer may also be used as a polymerizable monomer. The third polymerizable monomer includes acid monomers such as acrylic acid, methacrylic acid, maleic anhydride, vinyl acetate, as well as acrylamide, methacrylamide, acrylonitrile, ethylene, propylene, butylene vinyl chloride, N-vinyl pyrrolidone and butadiene.

Further, as the polymerizable monomer, a polyfunctional vinyl monomer may be used. Examples of the multifunctional vinyl monomer include di(meth)acrylates of diols such as ethylene glycol, propylene glycol, butylene glycol, and hexylene glycol, bifunctional or higher (meth) acrylates of tertiary or higher alcohols such as pentaerythritol and trimethylolpropane, and divinylbenzene.

The weight average molecular weight (Mw) of styrene-acrylic resin is determined by gel permeation chromatography (GPC). The weight average molecular weight (Mw) of the styrene-acrylic resin is preferably in the range of 1,000 to 100,000.

The method of producing styrene-acrylic resin is not particularly limited. Examples of the method use any polymerization initiator such as peroxide, persulfide, persulfate, and azo compounds, which are normally used in the polymerization of the above monomers. Examples of the polymerization method include known polymerization methods such as bulk polymerization, solution polymerization, emulsion polymerization method, miniemulsion method and dispersion polymerization method. Further, a commonly used chain transfer agent may be used for the purpose of adjusting the molecular weight. The chain transfer agent is not particularly limited. For example, alkyl mercaptans such as n-octyl mercaptan, and mercapto fatty acid esters such as n-octyl-3-mercaptopropionate may be mentioned.

The content of the binder resin in the white toner base particles is the amount obtained by subtracting the total content of white pigment and optional internal additives from the total amount of white toner base particles.

The total content of the amorphous resin in the binder resin is preferably in the range of 75 to 95 mass %, more preferably 85 to 95 mass %, relative to the total amount of the binder resin.

The content of the crystalline resin is preferably in the range of 5 to 25 mass %, and more preferably in the range of 5 to 15 mass %, relative to the total amount of the binder resin. By setting the content in such a range, sufficient fixing image strength and chargeability may be obtained.

When a styrene-acrylic resin and an amorphous polyester resin are used as an amorphous resin, the content of styrene-acrylic resin in the amorphous resin is preferably in the range of 70 to 90 mass %, and more preferably in the range of 80 to 90 mass %, relative to the total amount of the amorphous resin. In this case, the content of the amorphous polyester resin is preferably in the range of 10 to 30 mass %, more preferably in the range of 1 to 20 mass %, relative to the total amount of amorphous resin.

(Additive)

The white toner base particles may contain known additives (internal additives) in addition to the binder resin and the white pigment. Such additives include, for example, mold release agents and charge control agents.

(Mold Release Agent)

The white toner base particles may contain a mold release agent as necessary. A variety of known waxes may be used as the mold release agent.

Examples of the wax include hydrocarbon waxes such as a low molecular weight polyethylene wax, a low molecular weight polypropylene wax, a Fisher-Tropsch wax, a microcrystalline wax, and a paraffin wax; ester waxes such as a carnauba wax, pentaerythritol behenic acid ester, behenyl behenate, and behenyl citrate. These may be used alone or in combination of two or more.

The melting point of the above wax is preferably in the range of 50 to 95° C. from the viewpoint of ensuring low-temperature fixing and mold releasing properties of the white toner (A).

The content ratio of the wax as a mold release agent is preferably 2 to 20 parts by mass per 100 parts by mass of the binder resin, and more preferably 3 to 18 parts by mass parts, and even more preferably 4 to 15 parts by mass.

(Charge Control Agent)

The white toner base particles may contain a charge controlling agent as necessary. A variety of known charge control agents may be used as the charge control agent.

Various known positive and negative charge control agents that may be dispersed in an aqueous medium may be used as the charge control agent. Colorless or light-colored charge control agents that do not affect the color tone are preferred.

Specific examples thereof include nigrosine-based dyes, metal salts of naphthenic acid or higher fatty acids, alkoxylated amines, quaternary ammonium salt compounds, azo-based metal complexes, metal salts and metal complexes of salicylic acid and alkylsalicylic acid. It is preferable to use azo-based metal complexes, or metal salts and metal complexes of salicylic acid and alkylsalicylic acid.

The content ratio of the charge control agent is preferably 0.1 to 10 mass parts per 100 mass parts of the binder resin. More preferably, it is in the range of 0.5 to 5 parts by mass.

<External Additive>

An external additive is added to the surface of the white toner base particles. Silica particles are included as an external additive. In addition, it is preferable to contain titanium oxide particles (titania particles) in that charge leakage is suppressed by uniformly added external additive of titanium oxide particles.

The number average primary particle diameter of the titanium dioxide particles is preferably in the range of 60 to 120 nm. The number average primary particle diameter of the titanium dioxide particles is preferably larger than the number average primary particle diameter of the silica particles. The number average primary particle diameter of the silica particles is preferably in the range of 10 to 100 nm.

The measurement of the number average primary particle diameter is performed by, for example, the following method. Using a scanning electron microscope (SEM), for example, "JEM-7 401F" (manufactured by JEOL Ltd.), a SEM image of the inorganic fine particles magnified to an appropriate magnification is photographed. After binarizing the photographed images using an image processing analyzer, such as LUZEX AP (manufactured by Nireco Co., Ltd.), the horizontal Feret diameter of 100 inorganic particles is calculated, and the average value is used as the number average primary particle diameter.

The magnification of the SEM image is such that the total number of inorganic fine particles in the observation region is about 100 to 200. This measurement method is also applicable to the number average primary particle diameter of organic particles.

The silica particles and titanium oxide particles may be gloss-treated and hydrophobized with a silane coupling agent, a titanium coupling agent, a higher fatty acid, and a silicone oil in order to improve heat-resistant storage and environmental stability.

As silane coupling agents, dimethyldimethoxysilane, hexamethyldisilazane (HMDS), methyltrimethoxysilane, isobutyltrimethoxysilane, and decyltrimethoxysilane are preferred.

From each of the above points of view, it is preferable that the silica particles are surface-modified with silicone oil, and silica particles surface-modified with silicone oil are described below.

As for the silica particles used for surface modification, silica particles prepared by any known method may be used without restriction. Silica particles are produced by hydrolyzing alkoxysilane (sol-gel method), vaporizing silicon chloride and synthesizing silica particles by gas phase reaction in a high temperature hydrogen flame (gas phase method, gas combustion method), or by mixing finely ground silica stone, reducing agents such as metallic silicone powder and carbon powder, and water to make a slurry. The slury is heat-treated at high temperature under a reducing atmosphere to generate SiO gas. The SiO gas is then cooled under an atmosphere containing oxygen (melting method).

It is preferable that the silica particles are silica particles produced by the sol-gel method, because it is easier to obtain particles with a narrow particle size distribution and to control variations in the adhesion strength of the external additive to the white toner base particles.

More specifically, silica particles by sol-gel method may be produced by the following method. First, a TMOS hydrolysis solution is prepared by adding tetramethoxysilane (TMOS) to pure water. Next, the TMOS hydrolysis solution is added to a mixture of an alkali catalyst at a predetermined rate. Then, the alkali catalyst is added appropriately while adjusting the pH, and the TMOS hydrolysis solution is added at a constant rate at regular intervals, and this process is continued.

Then, by hydrolyzing and condensing, a mixed medium dispersion liquid of hydrophilic spherical silica particles may be obtained. Here, the particle size (number average primary particle diameter) and average circularity of the obtained silica particles may be determined by changing the addition amount of the alkali catalyst (addition amount to TMOS) and/or the addition rate of the TMOS hydrolysis solution. When the addition rate of the TMOS hydrolyzed solution is increased, the particle size of the silica particles tends to increase.

The alkali catalysts used in the above sol-gel method are not particularly limited. Examples thereof include ammonia; urea; monoamine compounds such as trimethylamine, triethylamine, and dimethyl ethylamine; diamine compounds such as ethylenediamine, tetramethylethylenediamine, tetramethylpropylenediamine, and tetramethylbutylenediamine; and quaternary ammonium salts.

The number average primary particle diameter of silica particles to be surface-modified by silicone oil (hereinafter referred to as "silica particles for surface modification") is preferably 5 to 300 nm. The number average primary particle diameter is as described above. Since the thickness of the surface modification layer formed on the surface of the silica particles by the surface modification with silicone oil described below is negligibly thin compared to the particle diameter of the silica particles, the number average primary particle diameter of the silica particles for surface modification and the number average primary particle size of the silica particles with the surface modification layer with silicone oil are approximately the same.

The average circularity of the surface-modifying silica particles is not particularly limited, but is preferably 0.730 to 0.980, more preferably 0.750 to 0.950, and still more preferably 0.800 to 0.945. The above average circularity may be measured by the following method. In addition, as with the number average primary particle diameter, the average circularity of the silica particles for surface modification and the average circularity of the silica particles having the surface modification layer with silicone oil are substantially the same. As with the number average primary particle diameter, the average circularity of silica particles for surface modification and the average circularity of silica particles with a surface-modified layer by silicone oil are approximately the same.

(Measurement of Average Circularity)

Using a scanning electron microscope (SEM), such as the "JEM-7 401F" (JEOL), and a SEM image of the silica particles magnified to an appropriate magnification is photographed. The photographed images are analyzed by an image processing analyzer, such as LUZEX (made by Nireco Co., Ltd.) to analyze the plane images of the photographed images, and determine the circularity of each of the 100 silica particles using the following formula (3) for each of 100 silica particles. The average circularity of the silica particles is obtained as 50% circularity in the cumulative frequency of the circularity of the 100 obtained silica particles.

$$\text{Circularity}=\text{Circular equivalent perimeter}/\text{Perimeter}=[2\times(A\pi)^{1/2}]/PM \quad \text{Formula (3):}$$

In Formula (3), PM represents the perimeter of the silica particles on the image, and A represents the projected area of the silica particles. π represents the circular constant.

The silicone oil that modifies the surface of silica particles may be any known silicone oil. Examples of the silicone oil include dimethyl silicone oil, alkyl-modified silicone oil, amino-modified silicone oil, carboxyl-modified silicone oil, epoxy-modified silicone oil, fluorine-modified silicone oil, alcohol-modified silicone oil, polyether-modified silicone oil, methyl phenyl silicone oil, methyl hydrogen silicone oil, mercapto-modified silicone oil, higher fatty acid-modified silicone oil, phenol-modified silicone oil, methacrylic acid-modified silicone oil, polyether-modified silicone oil, and methyl styryl-modified silicone oil.

One type of silicone oil may be used alone, or two or more may be used in combination, to the extent that it does not interfere with the expression of the effects of the invention. Among these, dimethyl silicone oil is preferred as the silicone fluid from the viewpoint of cost and ease of handling. The dynamic viscosity of dimethyl silicone fluid is preferably 10 to 100 $mm^2/s$ at 25° C.

The silica particles may be hydrophobically treated with a silane coupling agent before surface modification with silicone oil.

Example of the surface modification method of silica particles with silicone fluid include as follows: a dry method such as the spray-drying method, in which silicone oil or a solution containing silicone oil is sprayed on silica particles suspended in the gas phase; a wet method, in which silica particles are immersed in a solution containing silicone oil and then dried; and a mixing method of mixing silicone oil and silica particles with a mixer. In the wet method, silica particles surface-modified with silicone oil may be obtained by removing the solvent from a sol of silica particles surface-modified with silicone oil and drying.

Furthermore, by heat-treating the silica particles surface-modified with silicone fluid at temperatures ranging from 100° C. to several hundred ° C., the hydroxyl groups on the surface of the silica particles may be used to form siloxane bonds between the silica particles and the silicone oil, or the silicone oil itself may be further polymerized and cross-linked. The above reaction may be accelerated by adding a catalyst such as an acid, alkali, metal salt, zinc octylate, tin octylate, or dibutyl tin dilaurate to the silicone oil used. Excessively treated silicone fluid may also be removed by re-immersion in a solvent such as ethanol.

In silica particles surface-modified with silicone oil, the release rate of silicone oil is preferably in the range of 40% or more. If the release rate of silicone oil is 40% or more, when the surface-modified titanium dioxide particles are worn away and the titanium dioxide particles are exposed in the white toner base particles of the white toner, a sufficient amount of silicone oil may easily adhere to the surface of the worn titanium dioxide particles to compensate for the surface modification.

(Measuring Method of Release Rate of Silicone Oil)

The above-described release rate of silicone oil is the release rate of silicone oil released from silica particles externally attached to the toner, and may be measured by the following quantitative methods (1) to (3). Although the following methods describe the extraction of silicone oil from the toner, the above-described release rate represents the release rate of silicone oil released from the silica particles.

(1) Extraction of Free Silicone Oil

The sample from which the free silicone oil is to be extracted (i.e., the toner) is immersed in chloroform, stirred, and left to stand. Next, chloroform is newly added to the solids after the supernatant liquid is removed by centrifugation, and the mixture is stirred and left to stand. Repeat this process to remove the free silicone oil.

(2) Determination of Carbon Content

The amount of carbon in the sample before and after the extraction operation is measured by a CHN elemental analyzer (e.g., CHN coder Model MT-5, manufactured by Anatec Yanaco Corporation).

(3) Calculation of Silicone Oil Release Rate

The silicone oil release rate was determined by the following formula.

$$\text{Silicone oil release rate}=(C0-C1)/C0\times100(\%)$$

In the above formula, C0 and C1 mean as follows.

C0: Amount of carbon in the sample before the extraction operation

C1: Amount of carbon in the sample after the extraction operation

Further, as the external additive, other known inorganic fine particles, organic fine particles, and lubricant may be added in addition to the silica particles and titanium oxide particles mentioned above.

Examples of the other known inorganic particles mentioned above include inorganic fine particles made of alumina, strontium titanate, zinc titanate, and calcium titanate. These may be combined in two or more types. The number average primary particle diameter of these other inorganic fine particles is preferably about 10 to 100 nm. The measurement of the number average primary particle diameter of the other inorganic fine particles is the same as the method for measuring the number average primary particle diameter of silica particles and titanium dioxide particles described above.

These inorganic fine particles may also be hydrophobized by surface modification, if necessary. By using hydrophobized inorganic fine particles, for example, it is possible to suppress the adhesion between the white toner base particles due to the adsorption of water, which is generated due to the hydroxy group present on the surface of the inorganic oxide particles.

The surface-modifying agents used to modify the inorganic particles include silane coupling agents and titanium coupling agents. As silane coupling agents, dimethyldimethoxysilane, hexamethyldisilazane (HMDS), methyltrimethoxysilane, isobutyltrimethoxysilane, and decyltrimethoxysilane are preferred. Higher fatty acids and silicone oils may also be used as surface modifiers. As the silicone oil, the same silicone oil as described above may be used.

As organic particles, spherical organic particles with a number average primary particle diameter of 10 to 200 nm may be used. Specifically, organic particles made of styrene, methyl methacrylate, or other single polymer or copolymers of these materials may be used.

Lubricants are used for the purpose of further improving cleaning and transferability. Examples of the lubricant include zinc, aluminum, copper, magnesium, calcium, and other salts of stearic acid; zinc, manganese, iron, copper, magnesium, and other salts of oleic acid; zinc, copper, magnesium, calcium, and other salts of palmitic acid; zinc, calcium, and other salts of linoleic acid; zinc, calcium, and other salts of ricinoleic acid; and calcium and other salts of higher fatty acids. Various combinations of these external additives may be used.

The amount of silica particles added to the white toner is preferably in the range of 0.2 to 1.5 parts by mass per 100 mass parts of white toner base particles. The amount of titanium dioxide particles added is preferably in the range of 0.2 to 0.5 parts by mass. The total amount of external additives (total of silica particles, titanium dioxide particles, other inorganic and organic particles, and lubricants) added to the white toner is preferably in the range of 0.4 and 2.0 parts by mass to 100 parts by mass of the white toner base particles.

[Manufacturing Method of White Toner]

White toner may be manufactured by producing white toner base particles containing the white pigment described above and, if necessary, adding at least the silica particles described above as an external additive to the obtained white toner base particles.

Examples of the methods for producing white toner base particles according to the present invention include a kneading and pulverizing method, a suspension polymerization method, an emulsion aggregation method, a dissolution suspension method, and a dispersion polymerization method. Among these methods, the emulsion aggregation method is preferable from the viewpoint of uniformity of particle diameter and controllability of shape, which are advantageous for high image quality and high stability.

In the emulsion aggregation method, the dispersion liquid of fine particles of binder resin dispersed by a surfactant or dispersion stabilizer (hereinafter referred to as "binder resin fine particles") is mixed with the dispersion liquid of various fine particles to be included in the toner base particles. In the present invention, the dispersion solution of white pigment particles and the dispersion solution of fine particles of other components as optional ingredients are mixed with the dispersion liquid of various fine particles to be included in the toner base particles. After or at the same time as the aggregation, the toner base particles are formed by fusing the binder resin fine particles together and controlling their shape.

The following is an example of a method for manufacturing white toner base particles of the present invention by the emulsion aggregation method. The method for manufacturing white toner base particles by the emulsion aggregation method has the following processes (1) to (5).

(1) The process of preparing a dispersion liquid of white pigment particles in which white pigment particles are dispersed in an aqueous medium
(2) The process of preparing a dispersion liquid of binder resin fine particles in which binder resin fine particles containing internal additives are dispersed in an aqueous medium as necessary
(3) The process of mixing the dispersion liquid of white pigment particles and the dispersion liquid of binder resin fine particles to aggregate, associate and fuse the white pigment particles and binder resin fine particles to form white toner base particles
(4) Filtering the white toner base particles from the dispersion system of white toner base particles (aqueous medium) to remove surfactants
(5) Drying process of white toner base particles The dispersions prepared in (1) and (2) of the above manufacturing method may contain surfactants and dispersion stabilizers as necessary.

The preparation of the dispersion liquids may be done by using mechanical energy. Dispersing machines for dispersion are not limited. Examples thereof include a low-speed shear disperser, a high-speed shear disperser, a friction disperser, a high-pressure jet disperser, a ultrasonic disperser such as a ultrasonic homogenizer, and a high-pressure impact disperser such as Ultimizer.

Further, in the white toner base particles according to the present invention, when the binder resin contains an amorphous resin and a crystalline resin, as the dispersion liquid of the binder resin fine particles, the dispersion liquid of the amorphous resin particles (hereinafter, also referred to as "amorphous resin particles") and the particles of the crystalline resin (hereinafter, also referred to as "crystalline resin particles") is used. This dispersion liquid is mixed so that the ratio of the amorphous resin particles and the crystalline resin particles is the ratio described above is used.

Here, the binder resin fine particles may optionally be made to contain an internal additive such as a mold release agent or a charge control agent, and the particles may be composite particles formed by multiple layers consisting of two or more layers made of resins with different compositions.

The particle diameter of the binder resin fine particles used in the white toner base particles is preferably in the range of 100 to 30 nm in terms of median diameter on a volume basis for both amorphous resin particles and crystalline resin particles. The median diameter of the binder resin fine particles on a volume basis may be measured using a particle size distribution analyzer, such as the Nanotrack Wave (manufactured by MicrotracBEL Corp.).

In the process (3) of the above manufacturing method, the fine particles are slowly aggregated by balancing the repulsive force on the surface of the fine particles due to pH adjustment and the aggregation force due to the addition of a coagulant consisting of an electrolyte, and then aggregated while controlling the average particle diameter and particle size distribution. At the same time, the fine particles are fused together by heating and stirring to control their shape, thereby forming white toner base particles.

As a coagulant, there is no particular limitation, but those selected from salts of metals are suitable for use. Examples thereof include salts of monovalent metals such as sodium, potassium and lithium, salts of divalent metals such as calcium, magnesium, manganese and copper, salts of trivalent metals such as iron and aluminum. Specific salts include sodium chloride, potassium chloride Specific salts include sodium chloride, potassium chloride, lithium chloride, calcium chloride, magnesium chloride, aluminum chloride, copper sulfate, magnesium sulfate, and manganese sulfate. These may be used alone or in combination of two or more.

In the process (4), the toner base particles are solid-liquid separated from the dispersion liquid of white toner base particles using a solvent such as water. Washing is performed to remove adhering substances such as surfactants from the cake-like aggregate containing the filtered toner base particles. Specific methods of solid-liquid separation and washing include a centrifugation method, a vacuum filtration method using an aspirator or a Nutche, and a filtration method using a filter press. These methods are not specifically limited. In this process, pH adjustment and grinding may be performed as appropriate. These operations may be repeated.

Examples of the dryer used in the drying process in (5) include an oven, a spray dryer, a vacuum freeze dryer, a decompression dryer, a static shelf dryer, a mobile shelf dryer, a fluid bed dryer, a rotary dryer, and an agitating dryer. These are not particularly limited. The amount of water measured by the Karl Fischer potentiometric titration method in the dried white toner base particles is preferably 5 mass % or less, and more preferably 2 mass % or less.

The white toner base particles according to the present invention may be used as white toner base particles with a multilayer structure, such as a core-shell structure, in which the white toner base particles are core particles and the core particles have a shell layer covering their surface.

The shell layer does not have to cover the entire surface of the core base particles, and the core particles may be partially exposed. The cross-section of the core-shell structure may be confirmed by known observation methods such as transmission electron microscopy (TEM) and scanning probe microscopy (SPM).

In the case of a core-shell structure, it is possible to differ the glass transition point, melting point, hardness, and other characteristics between the core particles and the shell layer, making it possible to design a white toner base particle that meets the purpose. For example, a shell layer may be formed by aggregating and fusing a resin with a relatively high glass transition temperature (Tg) on the surface of core particles that contain a binder resin and a white pigment and have a relatively low glass transition temperature (Tg). It is preferable that the shell layer contains an amorphous resin.

Toner base particles having a core-shell structure may be obtained, for example, by the above emulsion aggregating method. Specifically, white toner base particles with a core-shell structure may be obtained by first producing core particles by aggregating, associating, and fusing the binder resin fine particles for the core particles and white pigment particles, adding the binder resin fine particles for the shell layer to the dispersion liquid of the core particles, and then aggregating and fusing the binder resin fine particles for the shell layer on the surface of the core particles to form a shell layer covering the surface of the core particles. It is preferable that the internal additive used arbitrarily is contained in the core particles.

The core particles may be fabricated so as to have a multilayer structure of two or more layers made of binder resins having different compositions. For example, when making binder resin fine particles with a three-layer structure, the polymerization reaction of the binder resin may be divided into three stages to produce the binder resin: first stage polymerization (formation of the inner layer), second stage polymerization (formation of the middle layer), and third stage polymerization (formation of the outer layer). Here, by changing the composition of the polymerizable monomer in each of the polymerization reactions from the first to the third stage polymerization, it is possible to produce binder resin fine particles having a three-layer composition with different compositions. Also, for example, by conducting the synthesis reaction of the binder resin with an appropriate internal additive such as a mold release agent in any of the first to third stage polymerization, it is possible to form binder resin fine particles having a three-layer composition containing an appropriate internal additive.

(Particle Size of White Toner Base Particles)

The volume average particle diameter of the white toner base particles of the present invention is preferably in the range of 4 to 10 μm. Although a smaller particle diameter is preferable from the viewpoint of improving image quality, a smaller particle diameter increases the adhesive force of the toner base particles and worsens the cleaning performance. When the volume average particle diameter of the white toner base particles is in the above range, it is possible to satisfy the requirements for both image quality and cleanability of output images, as well as the functions of charging, development, and transfer. When the particle diameter of the white toner base particles is in the range of 4 to 8 μm, it is more preferable from the above point of view, and higher image quality may be obtained due to improved dot reproducibility.

The volume average particle diameter of the white toner base particles may be calculated as the volume based median diameter (D50% diameter) using, for example, Multisizer 3 (manufactured by Beckman Coulter Corporation) equipped with a data processing software "Software V3.51".

The measurement procedure is as follows. 0.02 g of white toner base particles is dispersed in 20 mL of surfactant solution. After acclimation, ultrasonic dispersion is performed for 1 minute to prepare a white toner base particle dispersion liquid. As a surfactant solution, for example, a neutral detergent containing a surfactant component diluted 10 times with pure water may be used. The white toner base particle dispersion liquid is dropped into a beaker of ISOTONII (Beckman Coulter Corporation) until the concentration reaches 5 to 10%, and the measurement is carried out with the measurement device count set at 25000. The aperture diameter of the Multisizer 3 is set to be 100 μm. The measurement is performed by dividing the range of 2 to 60 μm into 256 parts and calculating the frequency count. The particle size of 50% from the one with the larger volume integration component is obtained as the volume based median diameter (D50% diameter), and is used as the toner volume average particle diameter.

(Average Circularity of White Toner Base Particles)

An average circularity of the white toner base particles is preferably in the range of 0.930 to 1.000 to improve the stability of charging and low-temperature fixability. It is more preferable that the average circularity is in the range of 0.950 to 0.995.

When the average circularity is in the above range, the individual white toner base particles are less likely to be crushed. This makes it possible to stabilize the chargeability of the toner by suppressing contamination of the frictional charge-applying member, and to enhance the image quality of the formed image.

The average circularity of the white toner base particles may be measured using a flow particle image analyzer, such as FPIA-2100 (manufactured by Sysmex Corporation).

Specifically, the measurement sample (white toner base particles) is acclimated in an aqueous solution containing surfactant and dispersed by ultrasonic dispersion treatment for one minute. After that, FPIA-2100 (manufactured by Sysmex Corporation) is used under the measurement conditions of HPF (high magnification imaging) mode to take a photograph with an appropriate density of 3000 to 10000 HPF detections. When the number of HPF detections is within the above range, reproducible measurement values may be obtained. From the taken particle image, the circularity of each white toner base particle is calculated according to the following formula (2). The average circularity is obtained by adding the circularity of each white toner base particle and dividing by the total number of white toner base particles.

Circularity of white toner base particles=(Circumference of circle with the same projected area as the particle image)/(Circumference of the particle projection image) Formula (2):

(Addition of External Additive to White Toner Base Particles)

The addition of the external additive to the white toner base particles may be performed, for example, by adding and mixing the external additive containing the silica particles of the present invention described above to the white toner base particles using a mechanical mixing device.

As mechanical mixing devices, a Henschel mixer, a Nauta mixers, and a turbulence mixers may be used. Among these, a mixing device that may impart shearing force to the particles being processed, such as a Henschel mixer, may be used to increase the mixing time or increase the rotational peripheral speed of the agitator blades. When multiple types of external additives are used, the toner particles may be mixed and treated with all the external additives at once or divided into multiple portions according to the external additives.

In the above-mentioned method of adding and mixing external additives, by using the above-mentioned mechanical mixing device, the degree and amount of desorption of the external additive attached to the surface of the white toner base particles may be controlled by controlling the mixing intensity (the intensity of attachment of the external additive to the white toner base particles), i.e., the peripheral speed of the agitator blades, the mixing time, or the mixing temperature. Specifically, they may be controlled so as to satisfy the relational expression (1) described above.

[Colored Toner]

The colored toner according to the present invention is composed of toner particles containing at least a binder resin, a colorant of a color other than white, and inorganic fine particles (also referred to as "colored toner particles"). In other words, the colored toner according to the present invention is composed of toner base particles (also referred to as "colored toner base particles") containing a binder resin and a colored colorant, to which inorganic fine particles are added as external additives.

The toner set of the present invention may include one type of colored toner, or two or more types of colored toners that differ in color in the toner image obtained by using different colored colorant contained. Specifically, the toner set of the present invention preferably includes four types of colored toners: a yellow toner, a magenta toner, a cyan toner, and a black toner.

In the following description, the colored toners of yellow toner, magenta toner, cyan toner, and black toner are also referred to as a yellow toner (By), a magenta toner (Bm), a cyan toner (Bc), and a black toner (Bk), respectively.

The toner set of the present invention typically contains only four types of colored toners: a yellow toner (By), a magenta toner (Bm), a cyan toner (B c), and a black toner (Bk).

<Colored Toner Base Particles>

The colored toner base particles contain at least a binder resin and a colored colorant. If necessary, it may also contain known additives (internal additives) other than the binder resin and the colored colorant.

The colored colorants contained in colored toners are described below, using a yellow toner (By), a magenta toner (Bm), a cyan toner (Bc), and a black toner (Bk) as examples.

A yellow toner (By), a magenta toner (Bm), a cyan toner (Bc), and black toner (Bk) have the same structure except for the colorants they contain. Colored toners other than these may also have the same configuration, except that the colored colorants are different.

(Colored Colorant)

As a colorant for black toner (Bk), any colorant known as black colorant may be used. Specifically, carbon black, magnetic material, and iron/titanium composite oxide black may be used. Examples of the carbon black includes channel black, furnace black, acetylene black, thermal black, and lamp black. Magnetic material includes ferrite, and magnetite.

As a colorant for yellow toner (By), any colorant known as yellow colorant may be used.

Specifically, usable dyes include C.I. Solvent Yellow 19, 44, 77, 79, 81, 82, 93, 98, 103, 104, 112, and 162; and usable pigments include C.I. Pigment Yellow 14, 17, 74, 93, 94, 138, 155, 180, and 185. The mixtures of these may also be used.

As a colorant for magenta toner (Bm), any colorant known as magenta colorant may be used.

Specifically, usable dyes include C.I. Solvent Red 1, 49, 52, 58, 63, 111, and 122; and usable pigments include C.I. Pigment Red 5, 48:1, 53:1, 57:1, 122, 139, 144, 149, 166, 177, 178, and 222. The mixtures of these may also be used.

As a colorant for cyan toner (Bc), any colorant known as cyan colorant may be used.

Specifically, usable dyes include C.I. Solvent Blue 25, 36, 60, 70, 93, and 95; and usable pigments include C.I. Pigment Blue 1, 7, 15, 60, 62, 66, 76 and 13:3. The mixtures of these may also be used.

The content ratio of the colored colorant in the colored toner base particles is preferably in the range of 0.5 to 2.0 parts by mass, and more preferably in the range of 2 to 10 parts by mass.

The binder resin in colored toner base particles may be in the same form as the binder resin in white toner base particles. Known additives (internal additives) other than the binder resin and colored colorant may be used in the same manner as the additives (internal additives) in the white toner base particles.

<External Additive for Colored Toner>

The external additives for colored toners include inorganic fine particles, organic fine particles and lubricants. For example, silica particles, titanium dioxide particles, and other known inorganic particles, organic particles, and lubricants, as exemplified as external additives for white toners, may be used. One type of these may be used alone, and two or more types may be used together.

The amount of external additive in a colored toner is preferably in the range of 0.1 to 1.0 parts by mass in total for 100 parts by mass of colored toner base particles.

[Manufacturing Method of Colored Toner]

Colored toners may be produced by manufacturing colored toner base particles and adding an external additive to the resulting colored toner base particles.

Colored toner base particles may be produced in the same way as white toner base particles, except that the white pigment in the white toner base particles is replaced with a colored colorant. The volume average particle diameter and average circularity of the colored toner base particles is preferably in the same numerical range as those of the white toner base particles.

The content of the binder resin in the colored toner base particles is the amount obtained by subtracting the total content of the colored colorant and optional internal additives from the total amount of the colored toner base particles.

The total content of amorphous resin in the binder resin is preferably in the range of 70 to 90 mass %, more preferably 80 to 90 mass %, relative to the total amount of the binder resin. The total content of the crystalline resin is preferably in the range of 10 to 30 mass5, and more preferably in the range of 10 to 20 mass %, relative to the total amount of the binder resin. By setting the content in such a range, sufficient fixed image strength and chargeability may be obtained.

When a styrene-acrylate resin and an amorphous polyester resin are used as the amorphous resin, the content of the styrene-acrylate resin in the amorphous resin is preferably in the range of 30 to 7 mass %, and more preferably in the range of 40 to 60 mass %, relative to the total amount of the amorphous resin. The content of the amorphous polyester resin is preferably in the range of 30 to 70 mass %, and more preferably in the range of 40 to 60 mass %, relative to the total amount of the amorphous resin.

As for the method of adding the above-described external additive to the colored toner base particles, the same method as the method of adding the external additive to the white toner base particles may be used. In particular, by using the above-mentioned mechanical mixing device to control the mixing strength (strength of adhesion of the external additive to the colored toner base particles). That is, by controlling the peripheral speed of the stirring blade, the mixing time, and the mixing temperature, the degree and amount of desorption of the external additive adhering to the surface of the toner base particles may be controlled so as to satisfy the above-mentioned relational expressions (2) and (3).

[Other Toners]

The toner set of the present invention may optionally include other toners. Other toners include a transparent toner (containing at least a binder resin and does not contain a colorant. In addition, other additives such as a mold release agent and an external additive may be included as necessary), a metallic color (containing at least a binder resin and a metallic pigment, and may also contain other additives such as a mold release agent and an external additive as necessary), a fluorescent toner (containing at least a binder resin and a fluorescent pigment, and may also contain other additives such as a mold release agent and an external additive as necessary), and a near-infrared absorbing toner (containing at least a binder resin and a near-infrared absorbing pigment, and may also contain other additives such as a mold release agent and an external additive as necessary). The following are examples.

[Developer]

The white toner, colored toner, and other toners in the toner set of the present invention are used as follows: in the case where a magnetic material is contained and used as a one-component magnetic toner; in the case where a so-called carrier is mixed and used as a two-component developer; and in the case where it is used alone as a non-magnetic toner alone. All of these may be suitably used.

Magnetic particles made of conventionally known materials, such as iron, ferrite, magnetite, and other metals, and alloys of those metals with aluminum, lead, and other metals, may be used as carriers that constitute the two-component developer. In particular, it is preferable to use ferrite particles.

As for the carrier, its volume average particle diameter is preferably in the range of 15 to 100 μm, and more preferably in the range of 25 to 60 μm.

As a carrier, it is preferable to use a carrier that is further coated with a resin, or a so-called resin-dispersion type carrier in which magnetic particles are dispersed in a resin.

As for the resin composition for the coating, there are no particular limitations. Examples thereof include an olefin resin, a cyclohexyl methacrylate/methyl methacrylate copolymer, a styrene resin, a-acrylic resin, a silicone resin, an ester resin, or a fluorine-containing polymerization system resins.

Further, the resin for forming the resin dispersion type carrier is not particularly limited, and a known resin may be used. Examples thereof include an acrylic resin, a styrene-acrylic resin, a polyester resin, a fluorine resin, and a phenolic resin.

[Recording Medium]

As a recording medium used in the present invention, an appropriate recording medium may be used. Examples thereof include various types of paper such as plain paper from thin to thick, coated printing paper such as fine paper, art paper or coated paper, commercially available Japanese paper and postcard paper, synthetic paper, film and cloth. Of these, synthetic paper and film are preferred.

Specific examples of the film include a polyethylene terephthalate film (PET film), a polyethylene naphthalate film, and a polyimide film.

The color of the recording medium is preferably a color that requires a white background (base layer) from the viewpoint of visibility, specifically it is preferably colorless and transparent and a color other than white.

[Image Forming Apparatus]

As an image forming apparatus to which the toner set of the present invention is applied, for example, the following apparatus may be mentioned. This apparatus contains one image carrier and a plurality of developers (specifically, five or more in a full-color image forming apparatus) filled with a developer of each color (specifically, a plurality of colors including white) arranged around the image carrier. Toner images corresponding to each color are formed on the image carrier, the toner images are sequentially transferred to an intermediate transfer body and superposed, and collectively transferred onto the image forming support and fixed by a thermal roller method to be visible. This apparatus uses a cycle method for forming an image (fixed image).

Further, as another example of the image forming apparatus in the present invention, the following apparatus may be mentioned. For example, an image forming unit having a developer and an image carrier for each color (specifically, a plurality of colors including white) is mounted for each color. A toner image is formed for each image carrier, and it is sequentially transferred onto an intermediate transfer body and superposed, and collectively transferred onto an image forming support and fixed by a thermal roller method to form a visible image (fixed image). This image forming method is called as a drum-tandem method.

Although the embodiments of the present invention have been described above, the present invention is not limited to the above-mentioned aspects, and various modifications may be made.

EXAMPLES

Hereinafter, the present invention will be specifically described with reference to examples, but the present invention is not limited thereto. In the following examples, the operation was performed at room temperature (25° C.) unless otherwise specified. Unless otherwise specified, "%" and "part" mean "mass %" and "part by mass", respectively.

[Production of Colored Toner and White Toner]

(1) Preparation of Dispersion Liquid of Binder Resin Fine Particles

As a dispersion liquid of the binder resin fine particles used for producing the colored toner and the white toner, a styrene-acrylic resin fine particle dispersion liquid, a crystalline polyester fine particle dispersion liquid, and an amorphous polyester fine particle dispersion liquid were prepared by the following methods.

<Dispersion Liquid of Styrene-acrylic Resin Fine Particles>

(First Stage Polymerization)

In a reaction vessel equipped with a stirrer, a temperature sensor, a cooling tube and a nitrogen introduction device, an aqueous surfactant solution was charged. This aqueous surfactant solution was prepared by dissolving 4 parts by mass of anionic surfactant made of sodium dodecyl sulfate ($C_{10}H_{21}(OCH_2CH_2)$ $2SO_3Na$) in 3040 parts by mass of ion-exchanged water. Further, a polymerization initiator solution prepared by dissolving 10 parts by mass of potassium persulfate (KPS) in 400 mass parts of ion-exchanged water was added, and the liquid temperature was raised to 75° C.

Next, a polymerizable monomer solution containing 532 parts by mass of styrene, 200 parts by mass of n-butyl acrylate, 68 parts by mass of meth, 68 parts by mass of methacrylic acid, and 16.4 parts by mass of n-octyl mercaptan was added dropwise a period of 1 hour. After the drop, polymerization (first stage polymerization) was carried out by heating and stirring at 75° C. for 2 hours to prepare a dispersion liquid of styrene-acrylic resin fine particles (1). The weight average molecular weight (Mw) of the styrene-acrylic resin fine particles (1) in the dispersion liquid was 16,500.

The weight average molecular weight (Mw) of the resin was determined from the molecular weight distribution measured by gel permeation chromatography (GPC). In the following, the weight average molecular weight (Mw) of the resin is the Mw measured by the same method.

Specifically, the measurement sample was added to tetrahydrofuran (THF) to a concentration of 1 mg/mL, and dispersed using an ultrasonic disperser for 5 minutes at room temperature, and then processed through a membrane filter with a pore size of 0.2 μm to prepare the sample solution. A GPC apparatus HLC-81 20GPC (manufactured by Tosoh Corporation) equipped with one column of TSK guardcolumn and three columns of TSKgelSuper-m was used. The column temperature was maintained at 40° C., and tetrahydrofuran was flowed as a carrier solvent at a rate of 0.2 mL/min.

Together with the carrier solvent, 10 μL of the prepared sample solution was injected into the GPC apparatus and the refractive index detector (RI detector) was used to detect the sample, and the molecular weight distribution of the sample was calculated using a calibration curve measured using monodisperse polystyrene standard particles. The calibration curves was prepared by measuring 10 points of polystyrene standard particles (manufactured by Pressure Chemical Corporation). The used polystyrene standard particles have a molecular weight of $6\times10^2$, $2.1\times10^3$, $4\times10^3$, $1.75\times10^4$, $5.1\times10^4$, $1.1\times10^5$, $3.9\times10^5$, $8.6\times10^5$, $2\times10^6$, and $4.48\times10^6$, respectively.

(Second Stage Polymerization)

In a flask equipped with a stirrer, a polymerizable monomer solution containing 101.1 parts by mass of styrene, 62.2 parts by mass of n-butylacrylic acid, 12.3 parts by mass of methacrylic acid, and 1.75 parts by mass of n-octyl mercaptan was charged. In addition, 93.8 parts by mass of paraffin wax HNP-57 (Japan Wax Co., Ltd.) was added as a mold release, and the internal temperature was heated to 90° C. to dissolve the wax. Thus, a monomer solution (m) was prepared.

In another container, an aqueous surfactant solution prepared by dissolving 3 parts by mass of the anionic surfactant used in the first stage polymerization in 1,560 parts by mass of ion-exchanged water was charged and heated to an internal temperature of 98° C. To this aqueous surfactant solution, 32.8 parts by mass (in terms of solid content) of the dispersion liquid of the styrene-acrylic resin fine particles (1) obtained by the first stage polymerization was added. Further, the monomer solution (m) containing the paraffin wax prepared above was added. By mixing and dispersing for 8 hours using a mechanical disperser CLEAMIX (manufactured by M Technique Co., Ltd.) with a circulation path, a dispersion liquid of emulsified particles (oil droplets) with a particle size of 340 nm was prepared.

To this dispersion liquid, a polymerization initiator solution in which 6 parts by mass of potassium persulfate was dissolved in 200 parts by mass of ion-exchanged water was added. Polymerization (second stage polymerization) was carried out by heating and stirring this system at 98° C. for 12 hours to prepare a dispersion liquid of styrene-acrylic resin fine particles (2). The weight average molecular weight (Mw) of the styrene-acrylic resin fine particles (2) in the dispersion liquid was 23,000.

(Third Stage Polymerization)

To the dispersion liquid of styrene acrylic resin fine particles (2) obtained in the second stage polymerization, a polymerization initiator solution composed of 5.45 mass parts of potassium persulfate dissolved in 2.20 mass parts of ion-exchanged water was added. To this dispersion liquid, a polymerizable monomer solution containing 293.8 mass parts of styrene, 154.1 mass parts of n-butyl acrylate, and 7.8 mass parts of n-octyl mercaptan was added dropwise at 80° C. over a period of one hour. After completion of the drop, polymerization (third stage polymerization) was carried out by heating and stirring for 2 hours, and then cooled to 28° C. to obtain a dispersion liquid [1] of styrene acrylic resin fine particles (3). The weight average molecular weight (Mw) of the styrene-acrylic resin fine particles (3) in the dispersion liquid was 2,680.

The volume based median diameter of styrene-acrylic resin fine particles (3) in the dispersion liquid was measured using a particle size analyzer Nanotrack Wave (MicrotracBEL Corp.), and the was 230 nm.

<Crystalline Polyester Fine Particle Dispersion Liquid>

In a heated and dried three-necked flask, 355.8 parts by mass of dodecanedioic acid (1,10-decanedicarboxylic acid) as a polyvalent carboxylic acid monomer, 254.3 parts by mass of 1,9-nonanediol as a polyhydric alcohol monomer, and 3.21 parts by mass of tin octylate as a catalyst were added. After the air in the vessel was removed by decompression, the vessel was replaced with nitrogen gas to create an inert atmosphere, and the reflux process was carried out at 180° C. for 5 hours with mechanical stirring. The temperature was gradually increased in an inert atmosphere and the mixture was stirred at 200° C. for 3 hours to obtain a viscous liquid product. While further cooling in the air, the molecular weight of the product was measured by GPC, and when the weight average molecular weight (Mw) reached 15,000, the decompression was released to stop the polycondensation reaction, and the crystalline polyester resin was obtained. The obtained crystalline polyester resin had a melting point of 69° C.

To a reaction vessel equipped with an anchor blade to provide stirring power, methyl ethyl ketone and isopropyl alcohol were added. In addition, the above-mentioned crystalline polyester resin coarsely pulverized by hammer mill was gradually added and stirred to dissolve it completely to obtain the polyester resin solution that became an oil phase. A few drops of dilute ammonia solution was added into the stirred oil phase, and then this oil phase was dropped into ion-exchanged water for inverted phase emulsification. Then the solvent was removed while reducing the pressure with an evaporator. The crystalline polyester resin particles were dispersed in the reaction system, and the solid content was adjusted to 20 mass % by adding ion-exchanged water to the dispersion liquid to prepare a dispersion liquid of crystalline polyester resin fine particles [1].

A volume based median diameter of crystalline polyester resin fine particles in the dispersion liquid was measured using a particle size analyzer Nanotrack Wave (MicrotracBEL Corp.), and it was 173.

<Amorphous Polyester Fine Particle Dispersion Liquid>

In a reaction vessel equipped with a stirrer, a nitrogen introduction tube, a temperature sensor and a rectification tower, the following were loaded: 139.5 parts by mass of terephthalic acid and 15.5 parts by mass of isophthalic acid as a polyhydric carboxylic acid monomer; and 290.4 parts by mass of 2,2-bis(4-hydroxyphenyl)propane propylene oxide 2 mol adduct (molecular weight=460), and 60.2 parts by mass of 2,2-bis(4-hydroxyphenyl)propane ethylene oxide 2 mol adduct (molecular weight 404) as a polyhydric alcohol monomer.

The temperature of the reaction system was raised to 190° C. over a period of one hour, and after confirming that the reaction system was stirred uniformly, 3.21 parts by mass of tin octylate was added as a catalyst. The temperature of the reaction system was raised from 190° C. to 240° C. over a period of 6 hours while the generated water was removed.

The dehydration-condensation reaction was continued for 6 hours while maintaining the temperature at 240° C. to obtain an amorphous polyester resin. The obtained amorphous polyester resin had a weight average molecular weight (Mw) of 15,000.

By performing the same operation as the preparation of the dispersion liquid of the crystalline polyester resin fine particles with respect to the obtained amorphous polyester resin, the dispersion liquid of the amorphous polyester resin fine particles having a solid content of 20 mass % [1] was prepared. The volume based median diameter of the amorphous polyester resin fine particles in the dispersion liquid was measured using a particle size distribution measuring device "Nanotrack Wave (manufactured by MicrotracBEL Co., Ltd.) and found to be 216 nm.

(2) Preparation of Colorant Particle Dispersion Liquid

A colored colorant particle dispersion liquid used for producing a colored toner and a white colorant particle dispersion liquid used for producing a white toner were prepared by the following methods.

<Colored Colorant Particle Dispersion Liquid>

90 parts by mass of sodium dodecyl sulfate was stirred and dissolved in 1,600 parts by mass of ion-exchange water. While stirring this solution, 420 parts by mass of Regal 330R (manufactured by Cabot Corporation) was gradually added as carbon black (colored colorant). Then, a dispersion liquid of colored colorant particles [1] was prepared by dispersion processing using a stirrer CLEARMIX (manufactured by M Technique Co., Ltd.). The particle diameter of the colored colorant particles in the dispersion liquid was measured using a particle size distribution analyzer Nanotrack Wave (MicrotracBEL Corp.), and it was 117 nm.

<White Colorant Particle Dispersion Liquid>

The pH was adjusted to 4.5 by adding a 0.1 mol/L hydrogen chloride aqueous solution to 1,000 parts by mass of ion-exchanged water. Then, 300 parts by mass of titanium dioxide particles, ET-500W (manufactured by Ishihara Sangyo Co., Ltd.) as white colored particles and 3 parts by mass of anionic surfactant (NEOGEN RK, manufactured by Daiichi Kogyo Seiyaku Co., Ltd.) were added. The mixture was dispersed in a round stainless steel flask using a homogenizer (ULTRATALUX T50: manufactured by IKA Corporation) for 5 minutes to obtain a white colored particle dispersion liquid [1].

ET-500W is a surface-modified titanium oxide particle in which spherical titanium oxide particles having a rutile-type crystal structure (number average primary particle size; 200 nm, Mohs hardness; 7.5) were surface-modified with antimony-doped tin oxide. The thickness of the surface-modified layer is negligibly thin compared to the particle diameter of the titanium dioxide particles.

(3) Production of Colored Toner Base Particles and White Toner Base Particles

Colored toner base particles and white toner base particles were manufactured as follows using the dispersion liquid of the binder resin fine particles and the dispersion liquid of the colorant particles obtained above.

<Production of Colored Toner Base Particles>

In a 5-liter stainless steel reactor equipped with a stirrer, a cooling pipe, and a temperature sensor, 270 parts by mass (in terms of solid content) of the dispersion liquid [1] of the styrene-acrylic resin fine particles (3) obtained above, and 60 parts by mass (in terms of solid content) of the amorphous polyester resin fine particle dispersion liquid [1], and 48 parts by mass (in terms of solid content) of the colored colorant particle dispersion liquid [1] were added. Further, 380 parts by mass of ion-exchanged water was added, and the pH was adjusted to 10 with 5 (mol/L) sodium hydroxide aqueous solution while stirring.

Under stirring, 5.0 parts by mass of 10 mass % aqueous polyaluminum chloride solution was added dropwise over a period of 10 minutes, and the internal temperature was raised to 75° C. The particle diameter was measured using Multisizer 3 (manufactured by Beckman Coulter Corporation, aperture diameter; 50 μm). When the volume average particle diameter (median diameter based on volume) reached 5.8 μm, an aqueous sodium chloride solution consisting of 160 mass parts of sodium chloride dissolved in 64 mass parts of ion exchange water was added. Heating and stirring were continued, and FPIA-2100 (manufactured by Sysmex Corporation) was used to measure the average circularity. When the average circularity reached 0.960, the internal temperature was cooled to 25° C. at a rate of 20° C./min.

After cooling, the solid-liquid separation was carried out using a basket centrifuge. The resulting wet cake was washed with ion-exchanged water at 35° C. in the same basket centrifuge until the electrical conductivity of the filtrate reached 5 μS/cm. Then, it was transferred to a flash jet dryer (manufactured by Seishin Enterprise Co., Ltd.) and dried until the water content became 0.5 mass % to obtain colored toner base particles [1].

<Production of White Toner Base Particles>

In a reaction vessel equipped with a stirrer, a condenser and a thermometer, the following were added: 200 parts by mass (in terms of solid content) of the dispersion liquid [1] of styrene-acrylic resin fine particles (3) obtained above, 30 parts by mass (in terms of solid content) of the amorphous polyester resin fine particle dispersion liquid [1], 20 parts by mass (in terms of solid content) of the crystalline polyester resin fine particle dispersion liquid [1], 175 parts by mass (in terms of solid content) of the white colorant particle dispersion liquid [1], 0.5 parts by mass of polyoxyethylene lauryl ether sodium sulfate aqueous solution, and 100 parts by mass of ion-exchanged water. Then, while stirring, 0.1 N hydrochloric acid was added to adjust the pH to 2.5.

Subsequently, 0.4 parts mass of a polyaluminum chloride aqueous solution (10% aqueous solution in terms of $AlCl_3$) was added dropwise over a period of 10 minutes. Then, the temperature was raised at a rate of 0.05° C./min while stirring, and the particle diameter of the aggregated particles was appropriately measured using "Multisizer 3" (manufactured by Beckman Coulter Corporation). When the volume average particle diameter (volume based median diameter) of the aggregated particles reached 5.0 μm, the temperature increase was stopped. While stirring, 0.05 (mole/liter) of aqueous sodium hydroxide solution was added to adjust the pH to 7. Then, the internal temperature was further raised to 85° C. When the average circularity reaches 0.960 using FPIA-2100 (manufactured by Sysmex Corporation), the mixed solution was cooled to room temperature at a rate of 10° C./min. The reaction solution was subjected to repeated filtration and washing, and it was dried to obtain white toner base particles [1].

(4) Production of External Additives (Preparation)

As an external additive for a colored toner and a white toner to be externally added to the colored toner base particles [1] and white toner base particles [1] obtained above, the commercially available external additives shown in Table I below were prepared. The silica particles 1 to 3 shown in Table I below are not surface-modified with silicone oil.

The average primary particle diameter was measured using the following method.

(Measurement of Number Average Primary Particle Diameter)

A scanning electron microscope (SEM), "JEM-7 401F" (manufactured by JEOL Ltd.) was used, and photographs of the SEM images of the inorganic particles (external additive particles) magnified to an appropriate magnification were taken. After binarizing the photographed image using an image processing analysis device, for example, "LUZEX AP (manufactured by Nireco Corporation)", the horizontal Feret diameter of 100 inorganic fine particles was calculated, and the average value thereof was used as the number average primary particle diameter.

TABLE I

| Type of external additive | Number average primary particle diameter [nm] | Product name |
|---|---|---|
| Silica particles 1 | 20 | JMT2000: Silica made by TAYCA Co. Ltd. |
| Silica particles 2 | 80 | x-24-9600-80A: Silica made by Shin-Etsu Chemical Co., Ltd. |
| Silica particles 3 | 12 | RX200: Silica made by Japan Aerosil Corporation |
| Titania particles 1 | 80 | MT-700B: made by TAYCA Co. Ltd. |
| Titania particles 2 | 50 | TAF500: made by Fuji Titanium Industry Co., Ltd. |
| Titania particles 3 | 100 | TAF520k: made by Fuji Titanium Industry Co.. Ltd. |
| Titania particles 4 | 20 | STT-30S: Titanium oxide made by Titan Kogyo, Ltd. |
| Titania particles 5 | 200 | CS-EL: made by Ishihara Sangyo Kaisha, Ltd. |
| Strontium titanate particles 1 | 80 | SW100: made by Titan Kogyo, Ltd. |

(5) Production of Colored Toner and White Toner (External Additive Treatment)

The colored toner base particles [1] and white toner base particles [1] obtained above, and various external additives were used to produce a colored toner and a white toner.

<Production of White Toner 1>

To 100 parts by mass of the white toner base particles [1] prepared as described above, the following were added:

Silica particles 1: 0.5 mass %

Titania particles (also referred to as "titanium dioxide particles") 1: 0.5 mass %.

The mixture was loaded in a Henschel mixer model "FM20C/I" (manufactured by Nippon Coke & Engineering Co., Ltd.). The rotational speed was set at 60 m/s and the mixer was stirred for 20 minutes to produce a "white toner 1" containing white toner particles. In addition, the product temperature at the time of external mixing was set to 40° C.±1° C. When the temperature reached 41° C., the cooling water was flowed through the outer bath of the Henschel mixer at a flow rate of 5 L/min, and when the temperature reached 39° C., the cooling water was flowed at a flow rate of 1 L/min. Thus, the temperature inside the Henschel mixer was controlled.

<Production of White Toners 2 to 8>

White toners 2 to 8 were produced in the same way as the production of white toner 1, except that the silica particles 1 and titania particles 1 were replaced with the external additives shown in Table II below.

TABLE II

| White toner No. | External additive A | External additive A Number average primary particle diameter [nm] | External additive B | External additive B Number average primary particle diameter [nm] |
|---|---|---|---|---|
| 1 | Silica particles 1 | 20 | Titania particles 1 | 80 |
| 2 | Silica particles 1 | 20 | Titania particles 2 | 50 |
| 3 | Silica particles 1 | 20 | Titania particles 3 | 100 |
| 4 | Silica particles 1 | 20 | — | — |
| 5 | Silica particles 3 | 12 | Titania particles 3 | 100 |
| 6 | Silica particles 2 | 80 | Titania particles 4 | 20 |
| 7 | Silica particles 3 | 12 | Titania particles 5 | 200 |
| 8 | Silica particles 1 | 20 | Strontium titanate particles 1 | 80 |

<Production of Colored Toner 1>

To 100 parts by mass of the colored toner base particles [1] prepared as described above, the following were added:

Silica particles 1: 0.5 mass %

Titania particles 1: 0.5 mass %

The mixture was loaded in a Henschel mixer model "FM20C/I" (manufactured by Nippon Coke & Engineering Co., Ltd.). The mixer was set to a rotation speed of 20 m/s and stirred for 20 minutes to produce colored toner 1 containing colored toner particles.

In addition, the product temperature at the time of external mixing was set to 40° C.±1° C. When the temperature reached 41° C., the cooling water was flowed through the outer bath of the Henschel mixer at a flow rate of 5 L/min, and when the temperature reached 39° C., the cooling water was flowed at a flow rate of 1 L/min. Thus, the temperature inside the Henschel mixer was controlled.

<Production of Colored Toners 2 to 5>

Colored toners 2 to 5 were produced in the same way as the production of colored toner 1, except that the peripheral speed of the blade tip when the external additive was added was changed as in Table III, and the strength of external additive adhesion was adjusted.

TABLE III

| Colored toner No. | Peripheral speed at the time of adding external additive [m/s] | Adhesion strength of colored toner (Co_Si(B)/Co_Si(A)) |
|---|---|---|
| 1 | 20 | 0.25 |
| 2 | 30 | 0.35 |
| 3 | 40 | 0.45 |
| 4 | 50 | 0.55 |
| 5 | 60 | 0.65 |

[Production of Toner Sets 1 to 12]

The white toner and colored toner obtained above were combined as shown in Table IV below to form toner sets 1 to 12.

[Evaluation]

<Transferred Dusts>

The toner set obtained as described above was evaluated as follows. A full-color copier of a commercial multifunction printer, "AccurioPress C6100" (manufactured by Konica Minolta, Inc.) was used. Under the environment of 20° C. and 50% RH, in the initial stage, 1,000 sheets of evaluation charts with a printing rate of 5% were output continuously at a printing speed of 1,000 sheets per minute using Rezac 75 (short gain paper, ream weight 130 kg, manufactured by Takeo Co., Ltd.). After that, under the environment of 20° C. and 50% RH, 100,000 test images having five vertical strip-shaped solid images with a width of 3 cm were continuously printed on A4 high quality paper (65 g/m$^2$). With Rezac 75 (short gain paper, ream weight 130 kg, manufactured by Takeo Co., Ltd.), 1000 sheets of evaluation charts with a printing rate of 5% were continuously output at a printing speed of 100 sheets per minute. An image of 1 dot-1 space with an output resolution of 1200 dpi on the A4 side was formed, and one image was taken out for every 100 sheets printed, and the dot reproducibility was visually evaluated. Ranks 2 to 5 were considered acceptable.

(Evaluation Criteria)

Rank 5: No disturbance or scattering of dots in any chart.

Rank 4: After 800 sheets of continuous printing, the dots are slightly disturbed when observed under magnification, but there is no scattering.

Rank 3: After 300 sheets of continuous printing, there is a slight disturbance of dots when observed under magnification, but there is no scattering.

Rank 2: Disturbance of dots is observed from the early stage of printing when observed under magnification.

Rank 1: Disturbance or scattering of dots is clearly observed visually.

<Cleanability>

The toner set obtained above was evaluated as follows. The evaluation apparatus was a commercially available digital full-color multifunction printer, "AccurioPress C6100" (Konica Minolta, Inc.). It was used as an evaluation apparatus. Under the environment of 20° C. and 50% RH, 100,000 test images having five vertical strip-shaped solid images with a width of 3 cm were continuously printed on A4 high quality paper (65 g/m$^2$).

Next, after the continuous printing, the output was made on A4 high quality paper (65 g/m$^2$). The density of the five points corresponding to the banded area and the five points corresponding to the non-banded area after the continuous printing was measured with a Macbeth reflectance densitometer RD907 (Macbeth). Then, the maximum image density difference was calculated by the following formula.

Maximum density difference=("Image density at the point with the highest image density among the five image densities in the part corresponding to the band during durability"−"Image density in the part corresponding to the non-band part")

Then, based on the calculated maximum image density difference, the following criteria were used to make a judgment. Ranks 2 to 4 were judged to be practical. Note that image density is an absolute density.

(Evaluation Criteria)

Rank 4: Maximum density difference of 0.03 or less (Passed)

Rank 3: Maximum density difference is greater than 0.03 and 0.06 or less (Passed)

Rank 2: The maximum density difference is greater than 0.06 and 0.09 or less (Passed).

Rank 1: Maximum density difference is greater than 0.09 (Rejected)

TABLE IV

| | White toner | | | | | Colored toner | | |
|---|---|---|---|---|---|---|---|---|
| Toner set No. | White toner No. | External additive A | External additive A Number average primary particle diameter [nm] | External additive B | External additive B Number average primary particle diameter [nm] | Colored toner No. | Peripheral speed at the time of adding external additive [m/s] | Adhesion strength White toner (Wh_Si(B)/ Wh_Si(A); |
| 1 | 1 | Silica particles 1 | 20 | Titania particles 1 | 80 | 3 | 40 | 0.84 |
| 2 | 1 | Silica particles 1 | 20 | Titania particles 1 | 80 | 5 | 60 | 0.84 |
| 3 | 1 | Silica particles 1 | 20 | Titania particles 1 | 80 | 1 | 20 | 0.84 |
| 4 | 2 | Silica particles 1 | 20 | Titania particles 2 | 50 | 2 | 30 | 0.8 |
| 5 | 3 | Silica particles 1 | 20 | Titania particles 3 | 100 | 4 | 50 | 0.9 |
| 6 | 2 | Silica particles 1 | 20 | Titania particles 2 | 50 | 3 | 40 | 0.76 |
| 7 | 2 | Silica particles 1 | 20 | Titania particles 2 | 50 | 3 | 40 | 0.8 |
| 8 | 4 | Silica particles 1 | 20 | — | — | 3 | 40 | 0.71 |
| 9 | 5 | Silica particles 3 | 12 | Titania particles 3 | 100 | 4 | 50 | 0.95 |
| 10 | 6 | Silica particles 2 | 80 | Titania particles 4 | 20 | 1 | 20 | 0.65 |

TABLE IV-continued

| | | | | | | | | |
|---|---|---|---|---|---|---|---|---|
| 11 | 7 | Silica particles 3 | 12 | Titania particles 5 | 200 | 4 | 50 | 0.98 |
| 12 | 8 | Silica particles 1 | 20 | Strontium titanate particles 1 | 80 | 1 | 20 | 0.68 |

| | Adhesion strength | | | | | |
|---|---|---|---|---|---|---|
| Toner set No. | Colored toner (Co_Si(B)/Co_Si(A)) | Difference | Transferred dusts Initial stage | Durability | Cleanability | Remarks |
| 1 | 0.45 | 0.39 | 5 | 5 | 4 | Present Invention |
| 2 | 0.65 | 0.19 | 4 | 4 | 2 | Present Invention |
| 3 | 0.25 | 0.59 | 5 | 5 | 2 | Present Invention |
| 4 | 0.35 | 0.45 | 4 | 4 | 3 | Present Invention |
| 5 | 0.55 | 0.35 | 5 | 3 | 4 | Present Invention |
| 6 | 0.45 | 0.31 | 4 | 4 | 4 | Present Invention |
| 7 | 0.45 | 0.35 | 5 | 3 | 4 | Present Invention |
| 8 | 0.45 | 0.26 | 3 | 3 | 3 | Present Invention |
| 9 | 0.55 | 0.4 | 5 | 3 | 4 | Present Invention |
| 10 | 0.25 | 0.4 | 1 | 1 | 3 | Comparative Example |
| 11 | 0.55 | 0.43 | 2 | 1 | 4 | Comparative Example |
| 12 | 0.25 | 0.43 | 2 | 2 | 4 | Comparative Example |

As shown in the above results, when the toner set of the present invention is used, there is no transferred dusts, less density difference in the output image, and superior cleaning performance compared to when the toner set of the comparative example is used.

Although embodiments of the present invention have been described and illustrated in detail, the disclosed embodiments are made for purposes of illustration and example only and not limitation. The scope of the present invention should be interpreted by terms of the appended claims.

What is claimed is:

1. An electrostatic latent image developing toner set comprising:

a white electrostatic latent image developing toner containing toner base particles containing a first binder resin and a white pigment, and a first external additive; and a colored electrostatic latent image developing toner including toner base particles containing a second binder resin and a colored colorant other than the white pigment, and a second external additive, wherein silica particles are contained as the first and second external additives, and the following relational expressions (1) and (3) are satisfied, $$0.70 \leq Wh\_Si(B)/Wh\_Si(A) \leq 0.95 \quad \text{Relational expression (1):}$$

$$0.2 \leq (Wh\_Si(B)/Wh\_Si(A)) - (Co\_Si(B)/Co\_Si(A)) \leq 0.5 \quad \text{Relational expression (3):}$$

wherein Wh_Si(A) represents an NET intensity of a Si element contained in the white electrostatic latent image developing toner measured by wavelength dispersive X-ray fluorescence spectrometer, Wh_Si(B) represents an NET intensity of the Si element contained in the white electrostatic latent image developing toner that has been ultrasonically dispersed in water, Co_Si(A) represents an NET intensity of a Si element contained in the colored electrostatic latent image developing toner as measured by the wavelength dispersive X-ray fluorescence spectrometer, and Co_Si(B) represents an NET intensity of the Si element contained in the colored electrostatic latent image developing toner that has been ultrasonically dispersed in water, as measured by the wavelength dispersive X-ray fluorescence spectrometer.

2. The electrostatic latent image developing toner set according to claim 1, wherein the first external additive in the white electrostatic latent image developing toner further contains titanium dioxide particles; and a number average primary particle diameter of the titanium dioxide particles is in the range of 60 to 120 nm.

3. The electrostatic latent image developing toner set according to claim 2, wherein the number average primary particle diameter of the titanium dioxide particles is larger than the number average primary particle diameter of the silica particles in the first external additive.

* * * * *